C. H. RESCH.
STEERING WHEEL LOCK FOR MOTOR VEHICLES.
APPLICATION FILED OCT. 13, 1919.

1,328,691.  
Patented Jan. 20, 1920.

Witnesses:  
C. Peinle Jr.  
John J. ...

Inventor,  
Charles H. Resch.  
By Victor J. Evans,  
Attorney.

UNITED STATES PATENT OFFICE.

CHARLES H. RESCH, OF YOUNGSTOWN, OHIO.

STEERING-WHEEL LOCK FOR MOTOR-VEHICLES.

1,328,691.                Specification of Letters Patent.    Patented Jan. 20, 1920.

Application filed October 13, 1919. Serial No. 330,222.

*To all whom it may concern:*

Be it known that I, CHARLES H. RESCH, a citizen of the United States, residing at Youngstown, in the county of Mahoning and State of Ohio, have invented new and useful Improvements in Steering - Wheel Locks for Motor-Vehicles, of which the following is a specification.

This invention relates to improvements in locks for the steering wheels of motor vehicles and has particular application to a key controlled steering wheel lock.

In carrying out the present invention, it is my purpose to provide a lock whereby the steering post of the motor vehicle may be held against turning movement by unauthorized persons, thereby preventing theft of the vehicle.

It is also my purpose to provide a lock of the class described wherein the locking bolt may be readily actuated to locking position and latched in such position to hold the steering post against turning movement and wherein such locking bolt may be relieved of the influence of the latching means and restored to normal or unlocking position so that the vehicle may be operated.

With the above and other objects in view, the invention consists in the construction, combination and arrangement of parts hereinafter set forth in and falling within the scope of the claims.

Figure 1:
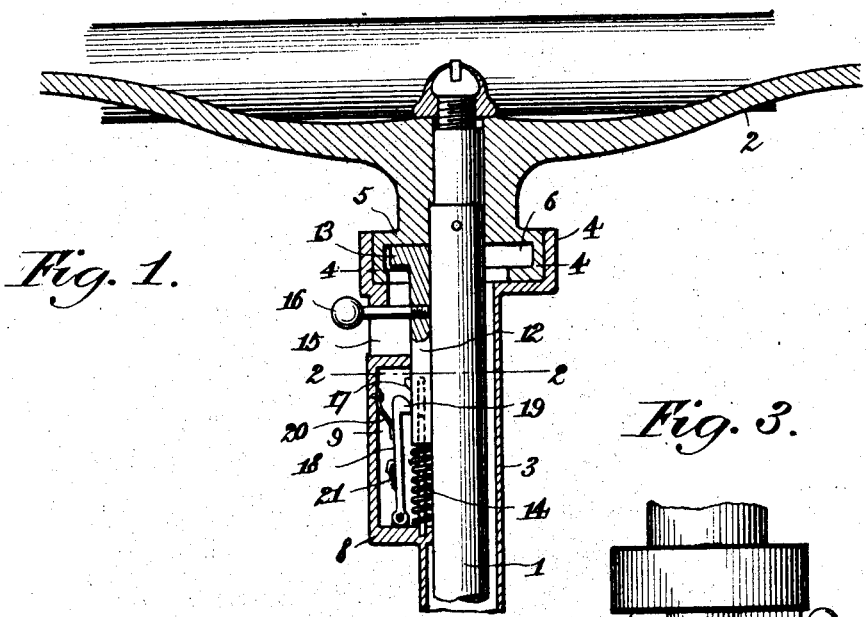
Figure 1 is a fragmentary vertical longitudinal sectional view through the steering column of a motor vehicle equipped with a lock constructed in accordance with the present invention.
Figure 3:
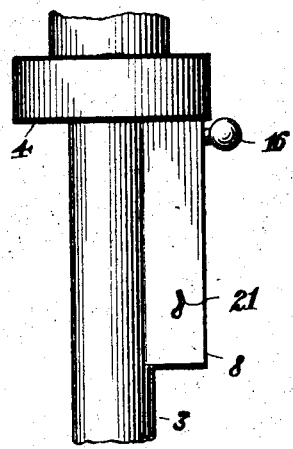
Fig. 3 is a fragmentary side elevation of the steering column equipped with my improved lock.
Figure 2:
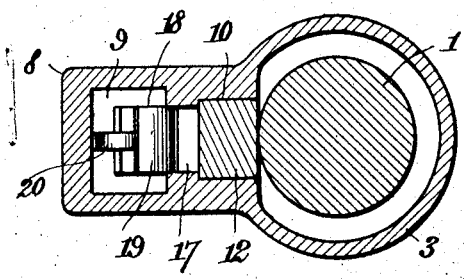
Fig. 2 is a transverse sectional view on the line 2—2 of Fig. 1.
Figure 4:
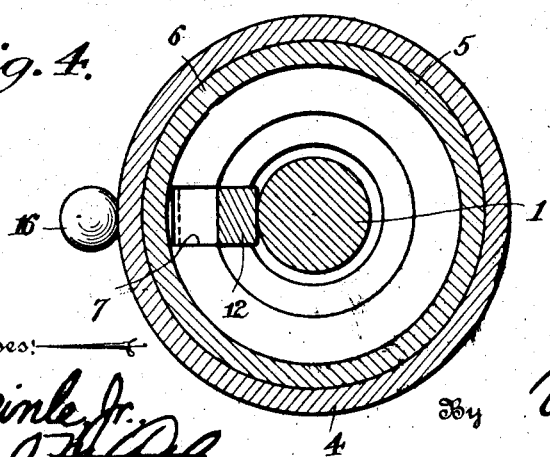
Fig. 4 is a transverse sectional view on the line 4—4 of Fig. 1.
Figure 5:
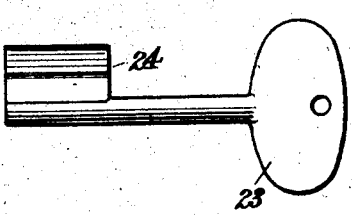
Fig. 5 is a view in side elevation of the key for releasing the locking bolt.

Referring now to the drawing in detail, 1 designates the steering post of a motor vehicle, while 2 indicates the steering wheel fast to the upper end of the post 1 whereby the post may be rotated to steer the vehicle, and 3 indicates the steering column surrounding the post 1 and having the lower end thereof fixed to the floor of the vehicle so that the column will be held stationary. In the present instance, the upper end of the column 3 is circumferentially enlarged as at 4 and seated within the circumferentially enlarged portion 4 of the column and capable of rotation therein is a collar 5 having the inner surface channeled as at 6 and the lower side wall of the channel formed with a slot 7. In this instance, the portion of the column 3 immediately below the slot 7 in the circumferentially enlarged portion 4 of the column is formed with an offset 8 and formed in the offset 8 is a vertical way 9 having the upper end thereof in registration with the slot 7. Formed in the inner wall of the way 9 is a vertical groove 10 and slidably mounted within the groove 10 is a locking bolt 12 having the upper end thereof adapted to move through the slot 7 and into the channel 6 in the collar 5 and formed with a laterally projecting nose 13 normally lying in the channel 6. Interposed between the lower end of the bolt 12 and the bottom wall of the way 9 is a coiled expansion spring 14 acting upon the bolt to hold the nose in the channel 6. The outer wall of the way 9 is formed with a slot 15 opening onto the outer side of the offset and connected with the bolt 12 and projecting through the slot 15 is an operating stem 16 whereby the bolt 12 may move downwardly against the action of the spring 16 to bring the nose 13 into the slot 7 and the upper end of the way 9, thereby forming a rigid connection between the collar 5 and the column 3 so as to prevent turning movement of the collar and the post.

Formed on the bolt 12 adjacent to the lower end thereof and projecting outwardly therefrom is a lug 17, while pivoted to the bottom wall of the way 9 is the lower end of a vertical arm 18 and formed on the upper end of the arm 18 is a nose 19 adapted to engage the lug 17 on the bolt 12. A spring 20 acts upon the arm 18 to hold the nose 19 normally in engagement with the adjacent edge of the bolt 12 so that the nose will engage the lug 17 when the bolt is moved downwardly under the action of the stem 16. Formed in one side wall of the offset 8 and opening into the way 9 is a keyhole 21 adapted to receive the shank 22 of a key, one end of the shank 22 being formed with a thumb piece 23, while formed on the shank adjacent to the remaining end thereof is a lug 24 adapted to engage the arm 18 when the key is turned after being passed through the keyhole.

In practice, when it is desired to lock the steering post 1 against rotation under the action of the hand wheel 2, the slot 7 in the lower side wall of the channel 6 in the collar 5 is brought into registration with the upper end of the way 9. The bolt 12 is now moved downwardly against the tension of the spring 14 under the action of the stem 16 and in the downward movement of the bolt, the lug 17 passes the nose 19 and when the stem is released, the nose engages the lug with the effect to hold the bolt in locking position. In this position of the bolt, the nose 13 is disposed in the slot 7 and the upper portion of the way 9, thereby forming a rigid connection between the collar 5 on the post 1 and the stationary column 3 so that turning of the post 1 is prevented. To release the bolt 12, the key is inserted in the keyhole 21 and turned and in the turning of the key, the lug 24 swings the arm 18 against the action of the spring 20 to disengage the nose 19 from the lug 17, thereby permitting the spring 14 to react and so slide the bolt 12 upwardly to move the nose 13 into the channel 6, thus permitting the steering post to be revolved under the action of the hand wheel so that the steering wheel of the vehicle may be turned.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a steering wheel lock, a steering post, a hand wheel on the upper end of said post, a column surrounding the post and having the upper end thereof circumferentially enlarged, a collar fast on said post at the upper end of the column and having the inner surface thereof channeled and the lower wall of the channel formed with a slot, said column being formed with an offset immediately below the slotted portion of said collar, the offset being formed with a vertical way adapted to register with the slot in said collar, a bolt slidably mounted in said way and having the upper end thereof formed with a nose normally disposed within said channel and adapted to be moved into said slot and the upper portion of the way to form a rigid connection between the collar and column whereby the post will be held against turning movement.

2. In a steering wheel lock, a steering post, a hand wheel on the upper end of said post, a column surrounding the post and having the upper end thereof circumferentially enlarged, a collar fast on said post at the upper end of the column and having the inner surface thereof channeled and the lower wall of the channel formed with a slot, said column being formed with an offset immediately below the slotted portion of said collar, the offset being formed with a vertical way adapted to register in said collar, a bolt slidably mounted in said way and having the upper end thereof formed with a nose normally disposed within said channel and adapted to be moved into said slot and the upper portion of the way to form a rigid connection between the collar and column whereby the post will be held against turning movement, and means for latching said bolt in latching position.

3. In a steering wheel lock, a steering post, a hand wheel on the upper end of said post, a column surrounding the post and having the upper end thereof circumferentially enlarged, a collar fast on said post at the upper end of the column and having the inner surface thereof channeled and the lower wall of the channel formed with a slot, said column being formed with an offset immediately below the slotted portion of said collar, the offset being formed with a vertical way adapted to register in said collar, a bolt slidably mounted in said way and having the upper end thereof formed with a nose normally disposed within said channel and adapted to be moved into said slot and the upper portion of the way to form a rigid connection between the collar and column whereby the post will be held against turning movement, and key controlled means for locking said bolt in latching position.

4. In a steering wheel lock, a steering post, a hand wheel on the upper end of said post, a column surrounding the post and having the upper end thereof circumferentially enlarged, a collar fast on said post at the upper end of the column and having the inner surface thereof channeled and the lower wall of the channel formed with a slot, said column being formed with an offset immediately below the slotted portion of said collar, the offset being formed with a vertical way adapted to register in said collar, a bolt slidably mounted in said way and having the upper end thereof formed with a nose normally disposed within said channel and adapted to be moved into said slot and the upper portion of the way to form a rigid connection between the collar and column whereby the post will be held against turning movement, means for latching said bolt in latching position, and means acting upon said bolt to hold said nose normally in said channel and adapted to restore the nose to normal position upon the release of the locking bolt by said latching means.

5. In a steering wheel lock, a steering post, a hand wheel on the upper end of said post, a column surrounding the post and having the upper end thereof circumferentially enlarged, a collar fast on said post at the upper end of the column and having the inner surface thereof channeled and the lower wall of the channel formed with a slot, said column being formed with an offset immediately below the slotted portion of said collar, the offset being formed with a vertical way adapted to register with the slot in said collar, a bolt slidably mounted in said way and having the upper end thereof formed with a nose normally disposed within said channel and adapted to be moved into said slot and the upper portion of the way to form a rigid connection between the collar and column whereby the post will be held against turning movement, and a stem secured to said bolt and projecting outwardly from said offset whereby the bolt may be operated to locking position.

6. In a lock for steering wheels of motor vehicles, a steering post, a hand wheel on the upper end of said post, a column surrounding said post and having the upper end thereof circumferentially enlarged, a collar fixed to said post and disposed in the enlarged portion of said column and having a slot formed therein, said column immediately below the slotted portion of said collar being formed with an offset, said offset being formed with a way, and a bolt slidably mounted in said way and having the upper end thereof adapted to enter said slot to lock said collar to said column whereby turning of said steering post is prevented.

7. In a lock for steering wheels of motor vehicles, a steering post, a hand wheel on the upper end of said post, a column surrounding said post and having the upper end thereof circumferentially enlarged, a collar fixed to said post and disposed in the enlarged portion of said column and having a slot formed therein, said column immediately below the slotted portion of said collar being formed with an offset, said offset being formed with a way, a bolt slidably mounted in said way and having the upper end thereof adapted to enter said slot to lock said collar to said column whereby turning of said steering post is prevented, and means for holding said bolt in locking position.

In testimony whereof I affix my signature.

CHARLES H. RESCH.